(12) United States Patent
Maes et al.

(10) Patent No.: US 10,073,336 B2
(45) Date of Patent: *Sep. 11, 2018

(54) PROJECTION SYSTEM WITH SAFETY DETECTION

(71) Applicant: Barco N.V., Kortrijk (BE)

(72) Inventors: Dirk Maes, Wevelgem (BE); Augustin Grillet, Conde sur l'Escaut (FR)

(73) Assignee: BARCO N.V., Kortruk (BE)

( * ) Notice: Subject to any disclaimer, the term of this patent is extended or adjusted under 35 U.S.C. 154(b) by 0 days.

This patent is subject to a terminal disclaimer.

(21) Appl. No.: 15/606,738

(22) Filed: May 26, 2017

(65) Prior Publication Data

US 2017/0261846 A1 Sep. 14, 2017

Related U.S. Application Data

(63) Continuation-in-part of application No. 14/426,770, filed as application No. PCT/IB2013/058305 on Sep. 5, 2013, now Pat. No. 9,677,945.

(30) Foreign Application Priority Data

Sep. 11, 2012 (GB) .................................. 1216129.5

(51) Int. Cl.
*G03B 21/20* (2006.01)
*H04N 9/31* (2006.01)
*G03B 21/14* (2006.01)

(52) U.S. Cl.
CPC ....... *G03B 21/2086* (2013.01); *G03B 21/147* (2013.01); *G03B 21/204* (2013.01); *H04N 9/3161* (2013.01)

(58) Field of Classification Search
CPC .......................... G03B 21/28; G03B 21/2033; G03B 21/2066; G03B 21/2086; G01S 17/10;
(Continued)

(56) References Cited

U.S. PATENT DOCUMENTS

2005/0035943 A1 2/2005 Kojima
2005/0110964 A1* 5/2005 Bell ........................ G06F 3/011
353/122
(Continued)

FOREIGN PATENT DOCUMENTS

JP 2005134563 5/2005
JP 2006227083 8/2006
(Continued)

OTHER PUBLICATIONS

International Search Report and Written Opinion dated Feb. 21, 2014 for Corresponding Application No. PCT/IB2013/058305.
(Continued)

*Primary Examiner* — Sultan Chowdhury
(74) *Attorney, Agent, or Firm* — Renner, Otto, Boisselle & Sklar, LLP

(57) ABSTRACT

A projection system including a safety detection system for a protected space, said projection system including a projection light source, a projection imaging system, a projection lens system, a detection source comprising at least of a detection light source and a detection camera comprising at least of a detection sensor, characterized by the fact that the optical axis of the projection source is identical to the optical axis of the detection source and the detection camera at least in the protected space.

23 Claims, 5 Drawing Sheets

(58) Field of Classification Search
CPC ........ G01S 17/026; G01S 17/36; G01S 17/48; G01S 17/66; H04N 9/3129; H04N 9/3161; H04N 9/3194
See application file for complete search history.

(56) References Cited

U.S. PATENT DOCUMENTS

| | | | |
|---|---|---|---|
| 2008/0174742 A1 | 7/2008 | Ito | |
| 2011/0001957 A1* | 1/2011 | Braune | G01B 11/00 356/4.01 |
| 2011/0285910 A1 | 11/2011 | Bamji et al. | |

FOREIGN PATENT DOCUMENTS

| | | |
|---|---|---|
| WO | 2008/032244 | 3/2008 |
| WO | 2009/031094 | 3/2009 |
| WO | 2011/012168 | 2/2011 |

OTHER PUBLICATIONS

International Preliminary Report on Patentability dated Mar. 26, 2015 for Corresponding Application No. PCT/IB2013/058305.

* cited by examiner

PROJECTION SYSTEM WITH SAFETY DETECTION

RELATED APPLICATIONS

This application is a continuation in part of application Ser. No. 14/426,770 filed on Mar. 9, 2015, that is national stage of PCT/M2013/058305 filed on Sep. 5, 2013, that claims the benefit of GB 1216129.5 filed on Sep. 11, 2012. All of which are herein incorporated by reference in their entirety.

The current invention relates to a projection system with projection screen detection and optional safety protection as well as methods for producing and operating such systems. In particular the present invention relates to gyroscopically stabilized projector e.g. for the stabilization of projected images, e.g. as projected from a drone or unmanned aerial vehicle.

BACKGROUND OF THE INVENTION

Projecting systems used to project still images, motion pictures or visual effects on a projection surface are widely used nowadays in for example cinemas, home cinemas, presentation rooms, exhibition areas, light shows, etc In most implementations (see FIG. 1), a projection light source (1) generates a light beam that is guided onto a projection imaging system (2) that will generate the individual pixels containing the color and brightness of the image to be projected. Then, the light is sent through a projection lens system (3) that will shape, position and focus the projection cone (14) before being projected on the projecting surface (20). This surface can be parametric, such as a flat surface when used for motion pictures or presentation material, or cylindrical or again half spherical when used for example to display immersive 360° visual content, but can also be irregular as for example used for the projection of images and motion pictures on buildings. A surface can also be completely absent in the case of light shows.

Laser light sources are becoming an attractive projection light source as alternative to traditional lamps and LEDs. They have many advantages over these traditional sources such as a longer lifetime, extended color gamut and increased brightness making them particular interesting for high brightness projection systems. Also the costs are evolving positively and in the coming years compact low cost laser diodes are expected to become available. Their main drawback however is the stringent safety regulations restricting their use. Laser devices are classified in safety classes according to their wavelength and intensity. Only class 1 and 2 lasers can be used freely. However, for a projection system, the output power of the laser source will exceed the emission levels of these two classes. Therefore a safety system must be included in the projecting system that will detect the presence of a person or an animal in the space where the projection cone can expose the person or animal with excessive laser light. This space that the safety system must at least cover is referred to as the protected space. This can be done be shutting down or reducing the laser light partially or completely. Moreover, a reflective object (21) might be exposed to the projection light (17), reflecting the laser light to a person or animal (22) that is not directly positioned within the projection cone (14). Therefore, also the presence of a reflective object (21) has to be detected even if it is relatively small.

U.S. Pat. No. 6,002,505 discloses a safety detection system for a laser projection system where a detection camera (9) including a sensor or sensor array (7) is used to detect the presence of an object in the laser projection cone (14) by sensing at least the volume of the projection cone, i.e. the protected space. The sensing can be done by different means like thermal measurement, acoustic measurement or electromagnetic measurement. It also includes a detection source (6) used for the irradiation of acoustic or electromagnetic waves. These waves are then reflected by the projection surface or objects and sensed by the detection camera (9), i.e. the sensors. Both the detection camera(s) (9) and detection source(s) (6) are placed nearby the projection system.

In U.S. Pat. No. 6,361,173 discloses a more specific detection system where an infra-red light source is used as detection source (4) and an infra-red camera is used as detection camera (9). Both are placed next to the projection source (1) and used for the detection of a person in protected space. In this application, the detection system is then used to turn off part of the projection light source preventing a person from being blinded.

Both prior art solutions described above have the intrinsic property of being susceptible to blind spots. Close by the lens or light source of the projecting system there will always be spots were an object will not be illuminated by the detection source and hence the detection system will fail. In some embodiments, this drawback has been overcome by putting up multiple detection sources and cameras around the projection source. However, although this limits the blind spot near the projection source drastically, it can never eliminate it.

Moreover, one can prove that in the case of a reflective object there will always be blind spots in the reflected area disregarding of the amount of detection sources and detection cameras that are used and disregarding whether the reflective object itself is in a blind spot or not. A second drawback of these prior art solutions is that the detection system has to be adjusted every time the projection source is changed, i.e. when another lens is mounted, when the zoom position of the lens is changed or when the lens is shifted.

SUMMARY OF THE INVENTION

Embodiments of the present invention are able to determine information about objects in the projection zone such as a projection screen surface of a projection imaging system, e.g. one or more or all of:

a) whether more than one projection screen is present within a projection cone, or whether one projection screen is covered by multiple projection cones, and whether such multiple projection cones are overlapping or not.

b) whether a projection screen is not aligned with the projection imaging system, e.g. whether the screen is perpendicular or not perpendicular to the optical axis of the projection imaging system, c) whether the surface of the projection screen is not flat or a correct shape such as spherical or cylindrical, d) whether the surface of a projection screen surface is not reflecting light from a projection light source correctly or the quality of the projection screen surface is not sufficient or whether the reflected colours are correct which includes detecting colours of the reflected light and optionally includes adjusting the image to obtain the correct reflected color, e) whether a projection screen is too far away or too close to the projection imaging system f) whether the image projected onto a projection screen surface is out of focus.

g) whether there is one or multiple objects such as a person illuminated in the projection cone h) whether the projection screen or the object is moving with respect to the projection cone or whether the projection cone is moving with respect to the projection surface or the object.

A projection screen for use with any of the embodiments of the present invention can be parametric, such as a flat surface when used for motion pictures or presentation material, or cylindrical or again half spherical when used for example to display immersive 360° visual content, but can also be irregular as for example used for the projection of images and motion pictures on buildings. A surface can also be completely absent in the case of light shows Embodiments of the proposed invention are able to perform one or more or all of the following actions in response to the determined information:

a) pre-warp and/or blend image data based on the determined information about the projection imaging system to allow for projection onto one or more projection screens of a non-flat shape or onto one or more misaligned projection screens, b) dynamically warp and/or blend image data based on the determined information about the projection imaging system to allow for projection onto one or more projection screens of a non-flat shape or onto one or more misaligned projection screens which vary in time, c) compensate for movements between the projector system and a projection screen, e.g. by scaling, lens shifting and/or zooming, rotating projected images, and/or adapting alpha blending values, d) provide a hovering drone based projection system whereby if the drone moves (translates vertically or horizontally, tips, and/or rotates), the image to be projected is warped and if required is rotated and/or scaled based on the determined information about the projection imaging system to compensate for these motions, or the images can be blended;

e) increase luminosity of images projected by the projection imaging system based on the determined information concerning the quality of the projection screen surface, or if the projection screen is too far away from the projection imaging system or to decrease luminosity of images projected by the projection imaging system if the projection screen is too close to the projection imaging system, f) focus an image projected onto a projection screen surface, by analysis of the determined information about the projection imaging system, g) reduce luminosity of images projected by the projection imaging system if an object such as a person is illuminated in the projection cone or to shut off laser light sources in this case.

h) stabilize a projector based on input from the determined information and/or input from other sensors such as one or more accelerometers and/or global positioning sensors.

i) provide a gyroscopically stabilized projector.

In one aspect, the present invention relates to a projection system including a projection light source (1), a projection imaging system (2), a projection lens system (3), a detection light source (4) and a detection sensor (7).

The optical axis of the projection source (11) is preferably the same as or identical to the optical axis of the detection light source (12) and the detection sensor (13), at least in the projection space. This provides the advantage that the projection system and the detection system can be incorporated in one system, e.g. the detection system is a subsystem of the projection system. This is particularly advantageous in the case e.g. of projection mapping applications, which often require long distances between the projection system and the projection screen surface and therefore require long throw, typically expensive, projection lenses. The detection light source (4) and the detection sensor (7), can be in the form of a detection subsystem that has an optical component configured to combine the optical axis of the detection source and the optical axis of the detection sensor.

The detection sensor can be a ToF (Time of Flight) sensor or camera. The ToF sensor or camera may operate with a non-visual light source such as an infra-red or near infra-red light source. The Time-of-Flight sensor or camera can, for example operate in gray-scale mode as well as or instead of time-of-flight mode. For example ToF sensors from the company PMD Technologies are based on photonic mixing technology for example and simultaneously deliver a 2D and a 3D image, see http://www.pmdtec.com/technology/unique_features.php.

In U.S. Pat. No. 6,777,659, which is incorporated herewith by reference, it is explained how a configuration of a sensor pixel using both modulation photogates and accumulation gates can deliver normal gray scale images as well as depth images.

In addition to the ToF sensor or camera, the detection subsystem may include an optional optical (visual light) camera or scanning device which is configured to image a projected image. The detection camera or scanning device can be a combined visual and ToF camera. For example some of the pixels of a combined ToF and visual camera can be configured to detect light from the detection light source reflected from the projection screen surface and to detect visual light reflected from the projection screen surface. Each pixel of a combined camera can be such a hybrid pixel, or a certain percentage of the pixels can be hybrid pixels. A hybrid pixel may include a filter or filters such that visible light is let through to a pixel sensor element of the visual camera and detection light is let through to a ToF pixel element of the ToF camera. The detection subsystem may include electronics that is able to receive output signals from the visual and/or ToF sensors or cameras and to calculate a distance from the sensor or camera to the projection screen surface based on the phase difference between outgoing detection light pulses from the detection light source and returning light pulses reflected from objects or the projection screen surface.

The projection system is preferably configured to produce a projection cone and a detection cone of projected light, which cones of light are for projection onto a projection screen surface which forms the projection space. Illuminated objects or the projection screen surface are detected as they are within the detection cone (16). The Time of Flight (ToF) sensor or camera produces an image and determines a distance to the detection sensor (7) of every illuminated object or the projection screen surface, as well as the 3D shape of said illuminated object or projection screen surface. The distance to the detection sensor (7) of every illuminated object or the projection screen surface may vary in time and the detection system determines these time varying distances as well as time varying misalignments of the projection system with respect to the projection surface.

The projection screen surface is preferably within the cone of projected light and cone of detection light so that its characteristics can be detected over the full dimensions of the projection screen surface and dynamically over time using the detection subsystem according to embodiments of the present invention. The projection system may also include a safety detection system for a protected space. The projection system can be configured to make use of the detection light source (4) and the detection sensor (7) to detect a person in a zone where laser light can be projected, The optical alignment of optical axes can guarantee for example, that the detection source cone (15) and detection sensor cone (16) completely overlap the projection cone (14), i.e. the projection screen surface and/or the protected space. Every object such as the projection screen surface, in the projection space or the protected space will now be illuminated by the detection source cone (15) and detected as it falls within the detection cone (16), so blind spots are excluded. Moreover there will be no blind spots in the reflective area of a reflective object or in the reflective area of a second reflective object that is on its turn positioned in the reflective area of a first reflective object.

In a preferred embodiment of the invention, the detection sensor (7) is a Time of Flight (ToF) sensor or camera. The ToF sensor or camera may operate with a non-visual light source such as an infra-red or near infra-red light source. In addition to the ToF sensor or camera, the detection subsystem may include an optional optical (visual light) camera which is configured to image a projected image. The TOF sensors or cameras can be CMOS sensors or cameras that have sensitivity in the visible spectrum as well as in the infr-res, e.g. Near IR. In the TOF sensor or camera illumination can be automatically eliminated from the depth measurements The detection camera can be a visual camera or a scanning device and a ToF sensor camera or can be a combined visual and ToF camera. For example some of the pixels of a combined ToF and visual camera can be configured to detect light from the detection light source reflected from the projection screen surface and to detect also visual light reflected from the projection screen surface. Each pixel of a combined camera can be such a hybrid pixel, or a certain percentage of the pixels can be hybrid pixels. A hybrid pixel may include a filter or filters such that reflected visible light is let through to a pixel sensor element of the visual camera and reflected detection light is let through to a ToF pixel element of the ToF camera. The detection subsystem may include electronics that is able to receive output signals from the visual and/or ToF sensors or cameras and to calculate a distance from the sensor or camera to the projection screen surface based on the difference between outgoing detection light pulses from the detection light source and returning light pulses reflected from objects or the projection screen surface. This can be done dynamically, i.e. capturing changes over time.

The projection system is preferably configured to produce a projection cone and a detection cone of projected light, which cones of light are for projection onto a projection screen surface which forms the projection space. Illuminated objects or the projection screen surface are detected as they are within the detection cone (16) or as they enter or move within the detection cone (16). The Time of Flight (ToF) sensor or camera produces an image and determines a distance to the detection sensor (7) of every illuminated object or the projection screen surface either statically or dynamically to capture changes over time.

In accordance with embodiments of the present invention preferably, the ToF camera or sensor can make an image and can also determine the distance from the detection sensor to every object, e.g. a person or a projection screen surface, it detects, and the 3D shape of every said object, either statically or dynamically. An Infra Red (IR), e.g. near infra-red light source such as an LED light can be used for the detection light source (4) having the advantage that it is invisible to the human eye. Therefore, it can be used during projection. The ToF detection sensor or camera (7) and the IR source light (4) are preferably operated in a pulsed regime with repetition rates up to, e.g. 80 MHz. As imaging system (2), a Digital Light Processing system can be used comprising, for example a TIR prism assembly (120) and colour splitting prism assembly (130). The alignment of the optical axis of the IR light and the ToF detection sensor or camera can be done by an optical component such as a beam splitter forming together a detection subsystem. Said subsystem can be inserted in the projection light path just after an integrator such as an integrator rod which combines the green, red and blue laser light components into a uniform white spot. The insertion of the subsystem results in a combination of its optical axis with that of the light from the projection light source such as laser light by means of a dichroic mirror. This combined light is then directed to the TIR prism by an optical system. In the colour splitting prism assembly, the detection light is guided towards the red DMD imager by appropriate reflective coatings on the prisms faces. A bonded slanted microstructure with IR reflective coating prevents the detection light from hitting on the red imager, but instead reflects it in the optical path of the red light component.

Another aspect of the present invention is to provide a system and method for determining three-dimensional (3D) static or dynamic information regarding a surface of an object and for projecting information onto the object surface such as a projection screen surface. An unmanned aerial vehicle or drone can be configured to fly with an on-board projector and detection subsystem and to hover. In embodiments of the present invention the detection subsystem can capture images from illuminated objects, e.g. can have a scanning device located on the unmanned aerial vehicle. The detection subsystem can be used by on-board or ground based electronics to measure the extent of a projection screen, i.e. two-dimensional size data or to derive three dimensional data of the object surface, e.g. projection screen surface or also dynamic changes in the extent. A ground or an embedded controller can be provided to control the flight path of the unmanned aerial vehicle, to maneuver the unmanned aerial vehicle into location in front of a suitable projection screen, and to hover there and project images onto the projection screen surface. If the drone changes position, e.g. do to wind or draughts, the projection system can be adapted to warp, rotate, scale, zoom, blend projected images to maintain the same image on the projection surface. Alternatively, if the projection surface changes position, the drone and/or projection system can react accordingly.

A drone or unmanned aerial vehicle according to embodiments of the present invention can include a projector and a stabilizer, or a projector-stabilizing mount. Such stabilizers or stabilizing mounts have been developed for stabilization of cameras and can be applied to an on-board projector according to embodiments of the invention. Such a device holds a projector in a manner that prevents or compensates for unwanted projector movement due to movement of the drone or unmanned aerial vehicle and/or with the addition that information determined by the drone detection system is input into the stabilizer which then compensates for changes in the alignment between the projector and the projection surface or other deviations which are detected by the detection system.

The stabilization can make use of springs as shock absorbers. Projector stabilization can also be performed by one or more on-board gyroscopes whose stability can be used to sense disruptive motion. The stabilization can be performed by a combination of a mechanical and an electronic stabilization. Embodiments of the present invention provide gyroscopically stabilized projector.

BRIEF DESCRIPTION OF THE DRAWINGS

The invention shall be better understood in light of the following description and of the accompanying drawings where.

DETAILED DESCRIPTION

Embodiments of the present invention make us of a Time-of-Flight (ToF) camera or sensor. A ToF camera or sensor can be described as a range-imaging camera system that resolves distance from the sensor to an illuminated object such as a person or a projection screen surface based on the known speed of light, and the delay of pulse of a projection light signal going there and back between the camera or sensor and the illuminated object. This can be done of for each pixel of an image or a certain number of pixels. The ToF camera or sensor provides depth information, from which a three-dimensional image can be derived by suitable electronics. The depth information may be static or dynamic, i.e. varies with time.

The detection camera or sensor or scanning device of the detection subsystem used in embodiments of the present invention can include a first photodiode for receiving reflected visible light and for detecting the reflected visible light, and a second photodiode for detecting a wavelength or wavelength region of light different from that of the first photodiode used for detecting a visual projected image. The detection camera can be described as a photoelectric conversion device that may transform detected light into electrical signals. The detection camera or sensor can include a plurality of pixels or pixel structures arranged in an array on a semiconductor substrate. Each of the pixels may include a photodiode or photodiodes and/or a plurality of transistors. The photodiodes may detect visible light and/or may generate and store charges, and the transistor may output electrical signals according to the stored charges. A complementary metal oxide semiconductor (CMOS) image sensor can be used as a detection sensor or camera. Such a CMOS image sensor or camera may include a photodiode that can receive and/or store optical signals and can realize images with signal processing.

The visual image detected by the first photodiode can be in colour or monochrome. A suitable optical filter or filters can be included in a pixel of the detection sensor or camera to filter out the relevant wavelength regions of the different wavelengths. Preferably only visible light can pass to the first photodiode in a pixel and only infrared light can pass to the second photodiode of the ToF pixel. Such filters can reduce interference and noise. The ToF sensors or cameras can operate by the photonic mixing principle and there is then no need for 2 independent detectors or filters to distinguish between visible and IR or near infra-red light. The sensor or camera does not need to provide a colour image.

Figure 1:
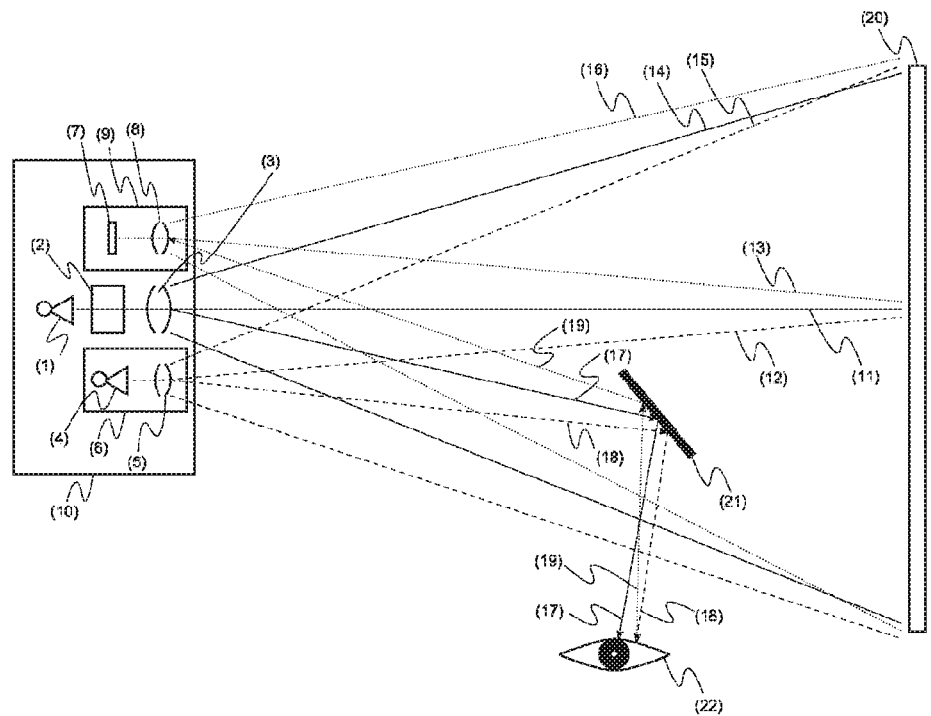
FIG. 1 shows a projection system with a safety detection system of the prior art.
Figure 2:
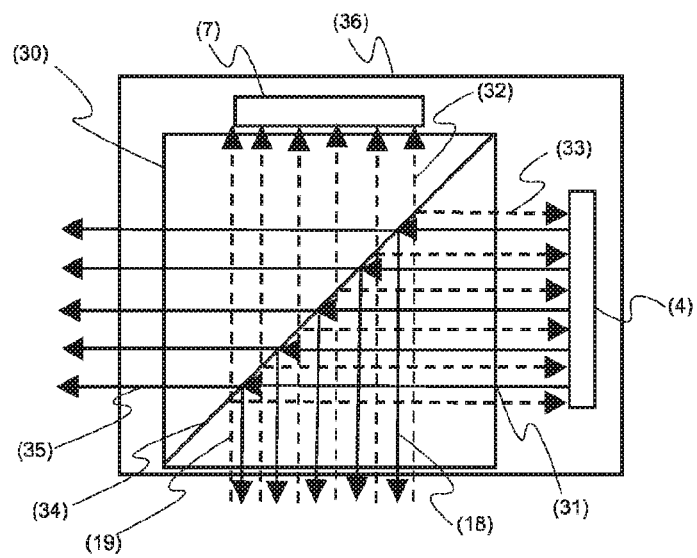
FIG. 2 shows a detection subsystem according to an embodiment of the present invention illustrating the combination of the optical axis of the detection light source and the optical axis of the detection sensor by means of a beam splitter.

As an optional first step towards specific embodiments of the invention, the optical axis of the detection sensor (7) or camera and the optical axis of the light from the detection light source (12) are made the same or even identical in a detection sub-system. In a first embodiment of said detection subsystem, this is achieved by using an optical component such as for beam splitting of the detection light (18) and reflected detection light (19). FIG. 2 shows such a detection subsystem (36) with the detection light source (4), detection sensor (7) or camera and a beam splitter (30). The irradiated detection light (31) that is irradiated by the detection light source (4) is reflected internally in the beam splitter (30) on a partially reflective surface (34). The reflected detection light (19) that was reflected back from an object or the projecting surface (20) will enter the beam splitter and will partially (32) hit on the detection sensor or camera and partially be reflected (33) to the detection light source (4). The amount of reflection depends on the specific implementation of the beam splitter (30).

One preferred type of beam splitter (30) that can be used is a Polarizing Beam Splitter or PBS. When the light (31) irradiated by the light source (4) hits on the reflective surface (34) of the PBS, only one polarization of the detection light source (4) is directed towards the protected space. If the detection light source (4) is already polarized no light is lost, otherwise about 50% of the light (35) will pass straight through the PBS. It is also possible to insert a polarizer in between the detection light source (4) and the PBS (30) to make sure only polarized light is entering the PBS. The person, animal or object to be detected will provide a diffuse reflection of the light and therefore the light returning (19) to the detection subsystem (36) will at least be partially depolarized. Only part of the reflected light (32) will have the appropriate polarization to pass the PBS (30) towards the detection sensor (7), the remainder will be reflected towards the detection light source (4). Even if a polarized detection light source (4) is used such as an Infra-Red laser for example, the sensitivity will be reduced by at least a factor 2. If the detection light source (4) is not polarized the overall sensitivity is reduced by at least a factor 4. Also a non-polarizing beam splitter, 50% mirrors for example, can be used, but then the efficiency is reduced to 25% as more power is needed for the detection light source (4). However, the general principle remains the same, and in general the power of the detection light source (4) can be selected according to the maximum projection distance supported by the projection system.

In a second embodiment of the sub-system that makes the optical axis of the detection sensor (7) and detection light source (4) the same or even identical, use is made of an optical component such as photosensitive elements and detection light emitting elements that are integrated on a single semiconductor substrate. Such so called bidirectional sensors have been demonstrated by the Fraunhofer institute using green OLED emitters (http://www.oled-info.com/fraunhofer-shows-new-bi-directional-oled-microdisplay-can-measure-distances).

Figure 3:
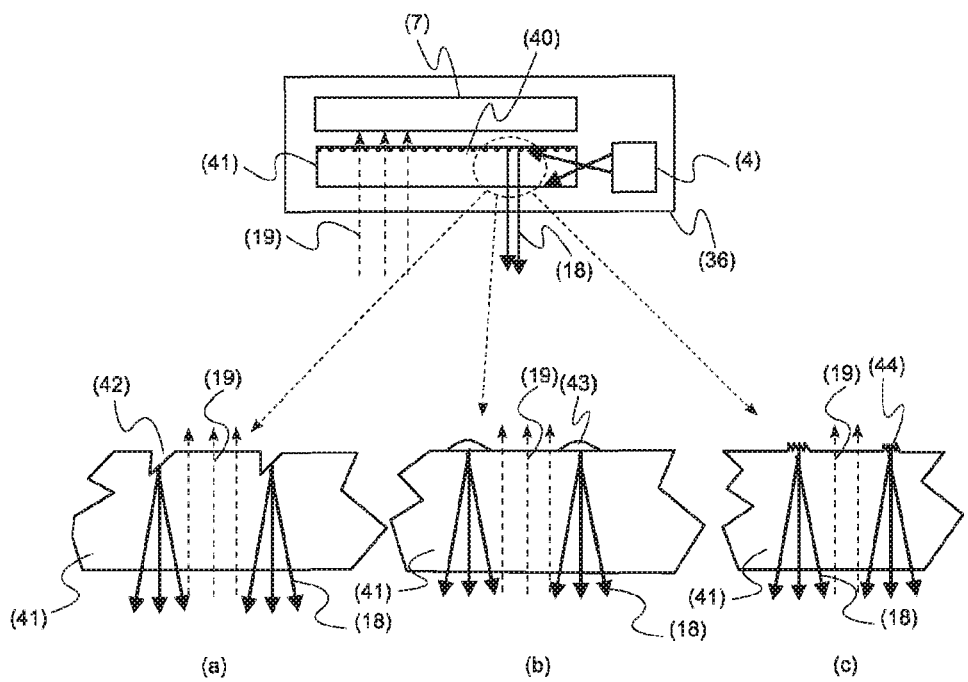
FIGS. 3(a), 3(b), and 3(c) shows another embodiment of a detection subsystem according to the invention illustrating the combination of the optical axis of the detection light source and the optical axis of the detection sensor by means of a light guide.

In a third embodiment of said detection sub-system (see FIG. 3), the combination of the optical axes can be achieved by the use of an optical component such as a light guide (41) placed in front of the detection sensor (7) or camera. The light guide is based on similar technology as edge lit backlights. By adding a patterned dot structure (40) on the light guide it is determined where the light is coupled out from the light guide. Ideally this pattern is placed in the inactive areas between the sensor pixels of the detection sensor (7). Due to the small size of the detection sensor pixels it might be challenging to achieve this level of precision and alignment. Alternatively a random pattern of dots could be used. The dot size is preferably smaller than the size of a sensor pixel. It is important that the dot pattern directs the light as much as possible to the front so that the detection light (18) does not scatter back towards the detection sensor (7). The effect of this backscattering can be reduced if a polarized detection light source (4) is used and if a cleanup polarizer is used between the camera detection sensor (7) and the light guide (41). In FIG. 3 a couple of possible implementations of the dot pattern are illustrated. In FIG. 3(a), a refractive structure (42) is used to deflect the light (18) in the light guide (41) via total internal reflection. In FIG. 3(b), a pattern of white painted dots (43) is used to provide a diffuse reflection of the light (18) in the light guide (41) incident on the dots. In FIG. 3(c), a refractive structure (44) is used to diffract the light (18) in the light guide (41) at certain positions. The advantage of the spatial interleaving is a more compact and potentially a more light efficient solution compared to the setup with the beam splitter.

In any of the embodiments of said detection subsystem, a lens system can be used in front of the detection sensor (7) or camera or detection source light (4) to match the size of the reflected detection light (19) with the size of the detection light (18).

In any of the embodiments of the invention, an invisible light source can be used with a wavelength different than the projection light source (1) as detection light source (4). This has the advantage that it does not intervene with the projected light; hence the screen detection system and/or the safety detection system can operate during the projection of projection light. One specific detection light source (4) that is preferably used is an infra-red light source such as a near infra-red source.

In any of the embodiments of the invention, a Time of Flight (ToF) sensor or camera can be used as a detection sensor (7) or camera. This type of sensor or camera has the advantage that it can measure the distance to any object in the detected space either statically or dynamically i.e. varying with time. To do so, the detection light source sends a light pulse and the ToF sensor measures a signal characteristic which is related to the time between the start of the light pulse and receipt of the reflected light pulse. This time difference which also exhibits itself as a phase difference of a periodically varying light is a direct indication of the distance from the object to the detection sensor. Therefore, this ToF sensor can sense if an object (20 or 22) such as the projection screen (20) is a reflective object and if it reflects the projection light (17). This allows detection of any person, animal or object (22) or projection screen (20) that is within a distance from the projection light source (1). The position of the person, animal or object (22) or projection screen (20) can vary in time.

In a preferred embodiment of the invention the detection subsystem (36) is placed after the projection lens system (3), i.e. the optical axis of the projection light (11) is combined with the optical axis of the detection subsystem (12) and (13) after the projection light (17) has traveled through the projection lens system (3). To combine the optical paths, an optical component such as a dichroic mirror can be used. The detection subsystem (36) preferably has its own lens system whereby said detection lens system preferably has magnification, shift and angular acceptance characteristics that are matched to those of the projection lens (3). This way, the detection source cone (15) and hence detection camera or sensor or scanned cone (16) can be made the same as or even identical to, or greater than the projection cone (14) in order to cover the projection and/or protected space. The light load and quality requirements for this detection lens system can be significantly less than those of the projection lens system (3). Therefore, cheap plastic lens elements (e.g. Fresnel lenses) can be used for the detection lens system. In a system where the projection system is fixed to a specific location, the settings of the detection lens system could be adjusted at installation time so that the detection cone (15) covers the projection cone (14) in all zoom positions and shifts of the projection lens system (3). In this case complex synchronized motorizations can be avoided while there is no impact on the projectors internal optics and therefore retrofits of a detection subsystem (36) to existing projection systems are possible. To make the adjustments of the detection lens system easier, the detection light source (4) may also contain a contribution of visible light or may be switchable or exchangeable between an invisible (infra-red for example) and a visible light source.

Figure 4:
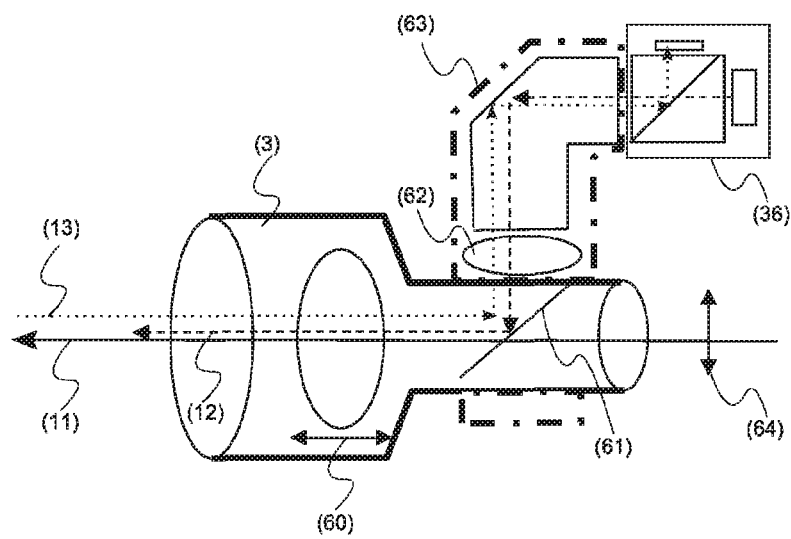
FIG. 4 shows a further embodiment of the system of the invention.
Figure 5:
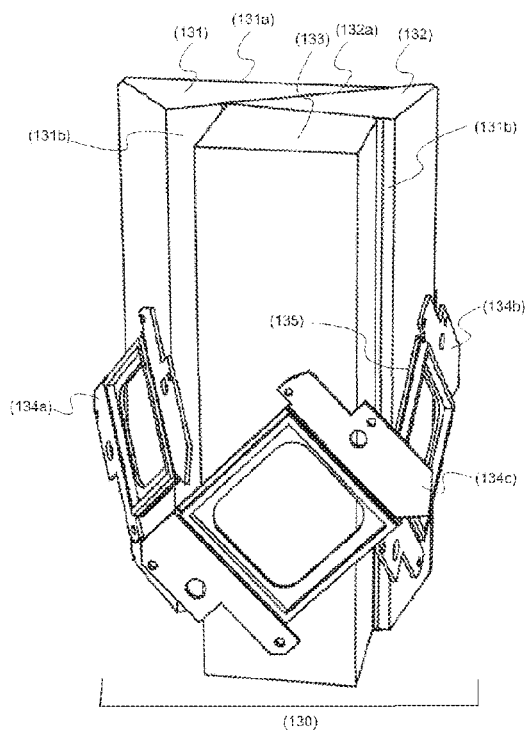
FIG. 5 shows a colour splitting prism assembly (130) according to the preferred embodiment of the invention.

In another preferred embodiment of the invention, as illustrated in FIG. 4, the optical path (12) and (13) of the detection subsystem (36) is combined with the optical path of the projection light (11) inside the projection lens system (3). When the projection lens system (3) is a zoom lens, then the preferred embodiment is to do the combination of the optical axes before the zoom group (60) as it is also illustrated in FIG. 5. In this case the zoom adjustments are applicable to both the projection light and the detection subsystem.

The combination of the optical axes before a lens can also have the advantage in the application where the ToF sensor or camera is used to determine the 3D shape of the projection screen. If the two axes are independent, then the structure of the screen can be determined either statically or dynamically, i.e. varying with time, but it is also required to know which part of the screen will be used to project onto in order to know what kind of geometry correction is needed. The geometry correction can vary with time. If the ToF sensor or camera is integrated in the projection system and the projection lens is used to capture the screen there is fixed relation between a pixel x,y on the sensor and a pixel x', y' of the projected image. In this case which part of the screen will be used to project onto will be known so that the geometry correction can be determined, either statically or dynamically.

The detection subsystem (36) can be integrated within the projection lens (3) or within the lens mount. The latter option is preferred as it allows easier integration with the projector and if a family of zoom lenses is used with a single projector, the detector cost is not multiplied with the number of zoom lenses in the family. Moreover, when the detection subsystem (36) is attached to the fixed part of the lens mount, it is possible for the system to respond to lens shift (64) simultaneously for the projection light (11) as for the detection light (12) and (13). For the combination of the optical paths an optical component such as a dichroic mirror (61) is integrated inside the lens and the lens barrel is opened allowing the entrance of the detection light (12) and escape of reflected detection light (13). The preferred position of the mirror (61) is in between the first lens element (closest to the projector) and the moveable lens group (60). An optical path similar to the one of the projection light is created for the detection light by inserting a lens (62) identical to the last lens of the projection lens and a glass block (63) that, together with the detection subsystem (36), creates an optical path length similar to the one inside the projector. This whole part consisting of the lens (62) and glass block (63) can be mounted onto the lens clamp system of the lens mount and will therefore move together with the projection lens (3) if shift (64) is applied. The detection subsystem can be mounted onto the fixed part of the lens mount or onto the chassis of the projector.

In another preferred embodiment of the invention, the optical axis (12) and (13) of the detection subsystem (36) is combined with the optical axis of the projection light source (11) before the projection lens system (3). The projection lens system (3) can then be used simultaneously for shaping the projection cone (14) and the detection source cone (15) and for receiving the reflected detection light (19). Such a solution is especially advantageous in a system with exchangeable lenses or when the lens system (3) is a zoom lens or when it provides lens shift. A change in any of these parameters will automatically have the same effect on the detection light (18), the projection light (17) and the reflected detection light (19). The combination of the optical axis of the projection source and the detection subsystem can be achieved by the insertion of an optical component such as a beam splitter in the optical path between the imaging system (2) and projection lens (3).

Figure 6:
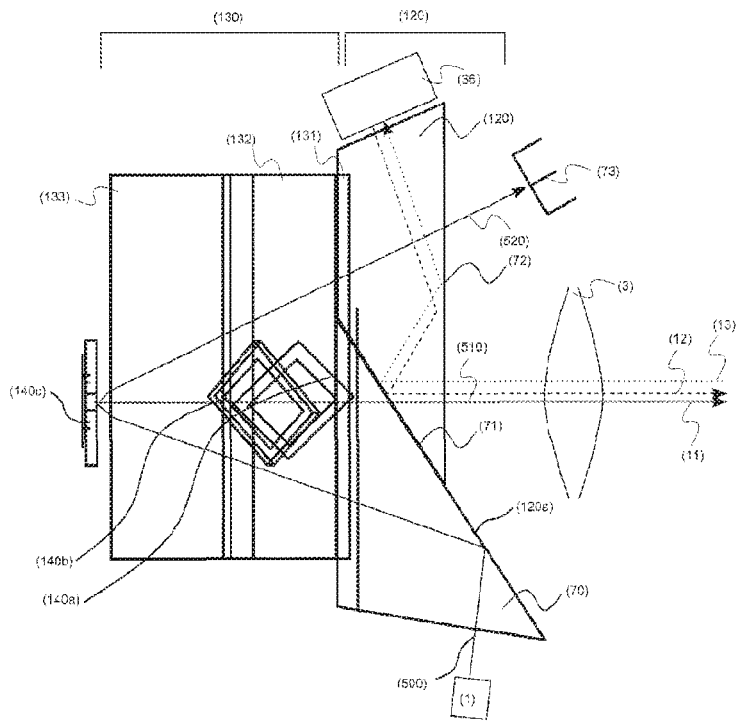
FIG. 6 shows a further embodiment of the system of the invention.

In another preferred embodiment, a Digital Light Processing (DLP) system is used as imaging system (2). A typical front view is shown in FIG. 6 and a top view in FIG. 9. The light (500) coming from the projection light source (1) and containing different colour components (Red, Green and Blue (RGB) for example) enters a Total Internal Reflection (TIR) prism assembly (120) and is reflected on said TIR prism (120) face (120a) into a colour splitting prism (130). Said colour splitting prism (130) (see also FIG. 5) splits the light (500) in its different colour components (500a), (500b) and (500c) and projects these light components onto the respective Digital-Micromirror-Device imagers (140a), (140b) and (140c). These imagers have an off- and on-state for every pixel of the projected image. If the pixel is in the off-state, the light is reflected (520) to an off-state heat sink (73). If the pixel is in the on-state, the light (510a), (510b) or (510c) is reflected back into the colour prism assembly (130) and combined to form the projection light (510) and (17). This light leaves then the imaging system and enters the projection lens system (3).

FIG. 6 illustrates a preferred embodiment of the invention where the combination of the optical axes is done before the projection lens (3) and where such a Digital Light Processing or DLP system is used as imaging system (2). This is achieved by an optical component comprising growing the height of the TIR prism (120) and applying a dichroic reflective coating (71) on one of the surfaces of the TIR prism (120a). This can be done without increasing the back focal length of the projection lens (3). The reflected detection light (13) received via the projection lens (3) will be deflected by the dichroic coating (71) and undergo total internal reflection on the front surface (72) of the TIR prism (120) before hitting the detection subsystem (36). The shape and size of the extended TIR prism (120) part can be adjusted such that the backworking distance between the detection sensor (7) and the projection lens (3) is matched to the backworking distance between the DMD imaging chips (140c), (140b) and (140a) and the projection lens system (3). Preferably, the backworking distance is slightly different such that when the projection image is focused onto the projection surface, the reflected detection light (13) is focused at the typical area of interest, for example a couple of meters in front of the projection lens system (3). Adjustment capabilities can be provided. The above assumes that the ToF detection sensor or camera in the detection subsystem (36) and the light valve devices such as DMD imaging chips (140c), (140b) and (140a) have identical sizes. This might not be the most practical and economical solution. A magnification system can be used to image a ToF detection sensor or camera onto position near the TIR prism with matched dimensions. Folding mirrors can be included in this magnification system for the convenience of integration into the projecting system. Because of the elongated TIR prism (120), the DLP off-state light (520) will now pass through this elongated TIR prism (120). The off-state heat sink (73) that absorbs this rejected off-state light (520) will need to be brought forward.

Figure 7:
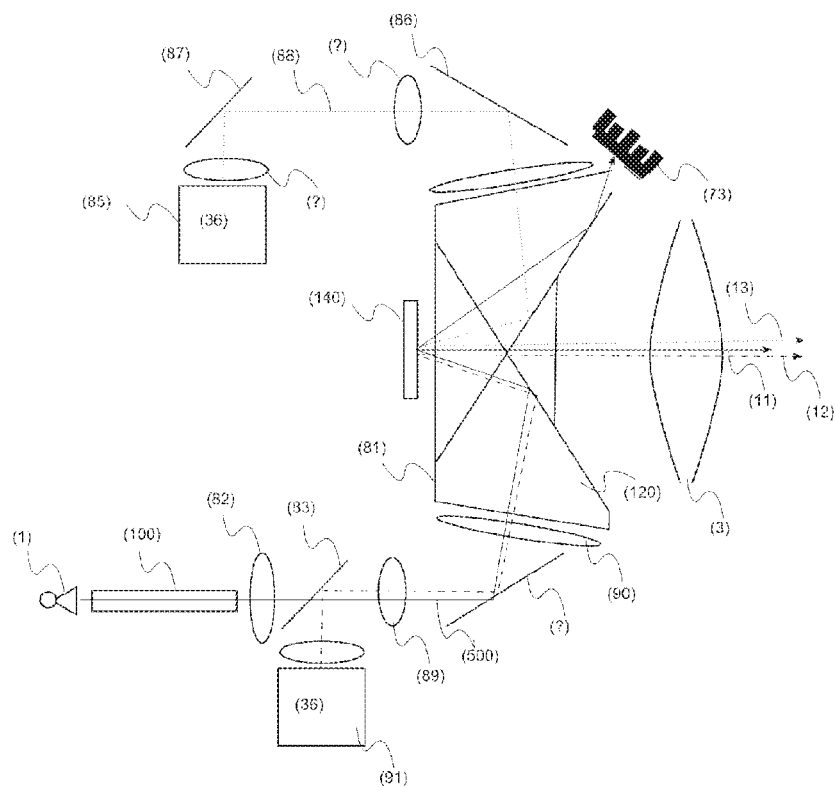
FIG. 7 shows a still further embodiment of the system of the invention.

In another preferred embodiment of the invention as illustrated in FIG. 7 where the combination of the optical axes is also done before the projection lens (3) and where a DLP system is used as imaging system (2), the reflective coating (71) from the previous embodiment as was illustrated in FIG. 6 is absent. The projector provides illumination optics (82), (89) and (90) to image the exit of an integrator rod (100) onto the imaging chips. An optical component such as a dichroic mirror (83) is introduced between these optics to combine the optical axis of the detection light (12) from the detection subsystem (91) with the source light (500) from the integrator rod (100). In this embodiment the coatings of the colour splitting prism (130) can be selected and applied in such a way that the detection light is directed towards a selected imaging chip (140c), (140b) or (140a), by selecting the coating according to the specific wavelength of the detection light. In this embodiment, the detection light (12) will hit on the selected imaging chip and be combined with the projection light (510) when the imaging chip is in the on-state. Assuming that it is possible to complete the safety detection in a small time period, it is then possible to put the all the pixels of the selected imaging chip in their on-state during the time period that the projection light source (1) or at least the component of the projection light source that needs to be reflected by the selected imaging chip (500a), (500b) or (500c) is shut down. However, this embodiment limits the detection period to the time that at least the component of the projection light source is shut down. However, when using a detection sensor that requires a significant amount of time to perform a reliable detection at acceptable illumination levels, for example a ToF detection sensor, it might not be practical nor cost effective to shut off the said component of the projection light source for that long. Therefore, a second detection subsystem (85) as illustrated in FIG. 7 can be added. The detection subsystem (85) can then be positioned in such a way that its detection source light (11) will travel in the direction of projection light source when the pixels of the selected imaging chip are in the off-state position, i.e. when the projection source light is directed to the off-state heat sink (73). The detected light will then either be directed towards the first detection subsystem (91) along the illumination axis (12) or towards the second detection subsystem (85) along the off-state light axis (88). If the signals from both detection subsystems (85) and (91) are added together, detection of an object on the projected light beam will still be guaranteed. A symmetric or dual TIR prism (120) disclosed earlier in WO2008155367 could be used to create the detection path (88) in the off-state direction.

Figure 8:
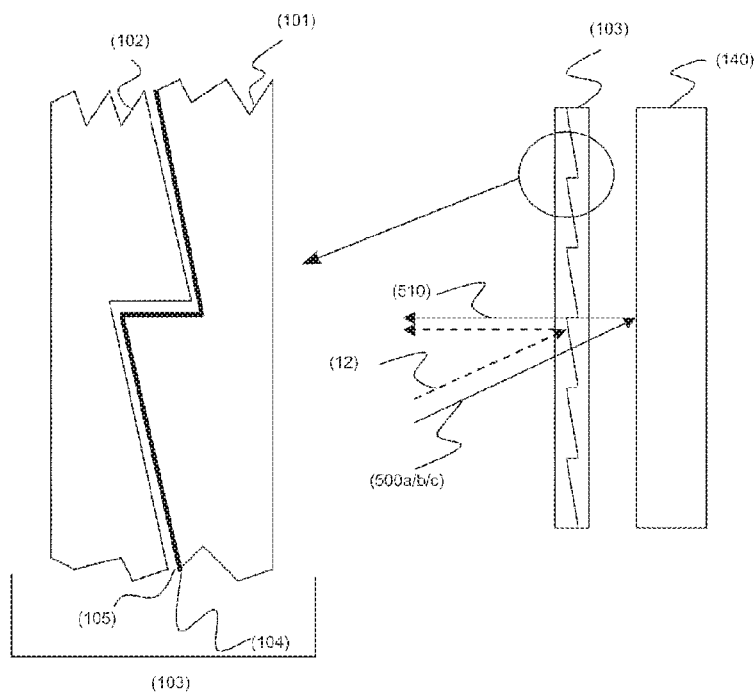
FIG. 8 shows a reflective structure of a preferred embodiment of the system of the invention.

In another embodiment, a similar setup is provided as in FIG. 8 using a detection subsystem (91) of which the optical path (12) is combined with the optical path of one component (500a), (500b) or (500c) of the projection light source. However, as illustrated in FIG. 8, not the on-state reflection of the selected imaging chip, i.e. (140c) or (140b) or (140a), is used to reflect the detection light (12), but a reflective optical component such as a slanted reflecting structure (103) in between the selected imaging chip and the prism. The angle of this structure (103) is matched to the on-state angle of the selected imaging chip, such that the detection light (12) is reflected in the same direction as the on-state light (510) of the selected imaging chip, but independent from its on- or off-state. In a practical setup, the space between the prism and the selected imaging chip is too limited to allow a monolithic glass substrate covered with a reflective coating (105) to be inserted at the needed 12 degree angle. Furthermore, if a glass plate is inserted at this position under an angle, it would introduce astigmatism in the selected component of the projected light. Therefore, 2 optically bonded micro-structured glass plates (101) and (102) can be used as illustrated in FIG. 8. The detection light will then be reflected at the desired angle but for the selected projection light component, the structure will behave as a transparent parallel glass plate. If the thickness is limited, the effect on the imaging of the selected projection light component is negligible. In a single-chip structure, the bonded micro-structured plates (101) and (102) are inserted between the TIR prism and the DMD imagine chip.

It is possible to combine the principles described in the embodiments using a DLP system and put the detection sensor and the detection source light source separately at either of the positions illustrated in FIG. 7. Their respective optical axes are then combined based on polarization using an optical component with a dichroic coating that is polarization selective for the detection light source and polarization independent for the projection light source. One can, for example, integrate the detection light source with the projection light sources and send a detection pulse via the selected imaging chip that is put in the on-state during a time where the selected component of the projection light source is idle. The TIR prism surface is then coated with a dichroic coating that transmits all the visible on-state light as well as part of the detection pulse with a preferred polarization direction, while it reflects detection light with the orthogonal polarization direction. The same coating on the TIR prism will direct part (the part with appropriate polarization) of the reflected detection light that is received via the projection lens towards the detection sensor via an elongated TIR prism.

When designing the optics that are common for both the detection light as well as the projection light, anti-reflection coatings should be effective for both the wavelength of the projection light as well as the detection light. The dichroic mirrors should have high reflectivity in the spectrum of both the projection and detection light. Also, where it is desired that the detection light and the selected component of the projection light are split off towards the same DMD, the dichroic coatings should be reflective for both the selected component of the projection light as well as for the detection light. No coatings that block the detection light should be used, except where the slanted reflective microstructure is used.

Figure 9:
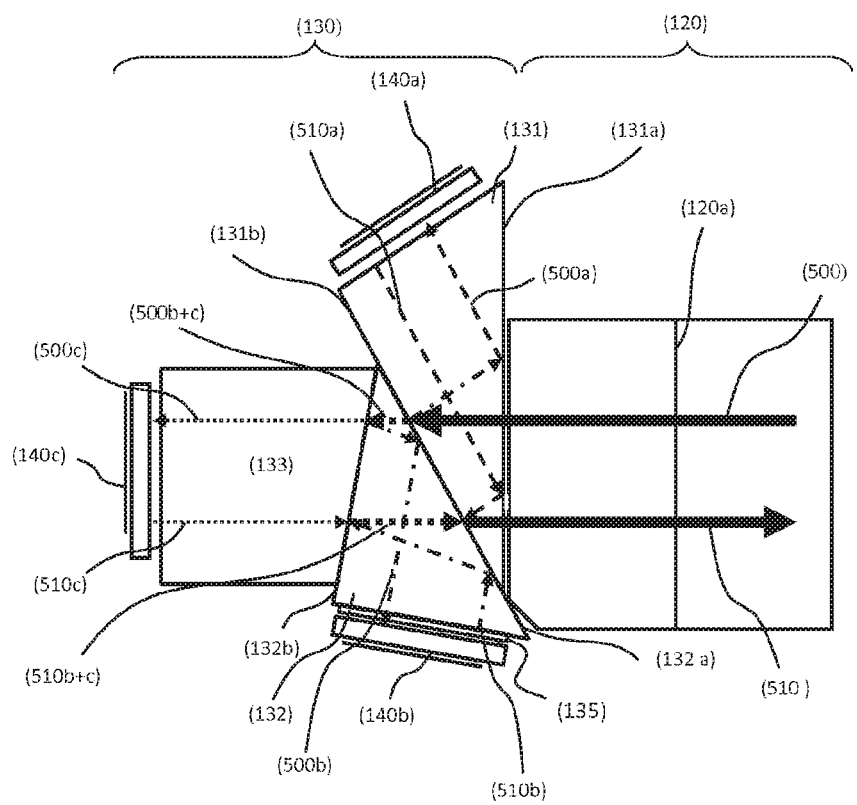
FIG. 9 shows a top view of the imaging system according to a preferred embodiment of the invention.
Figure 10:
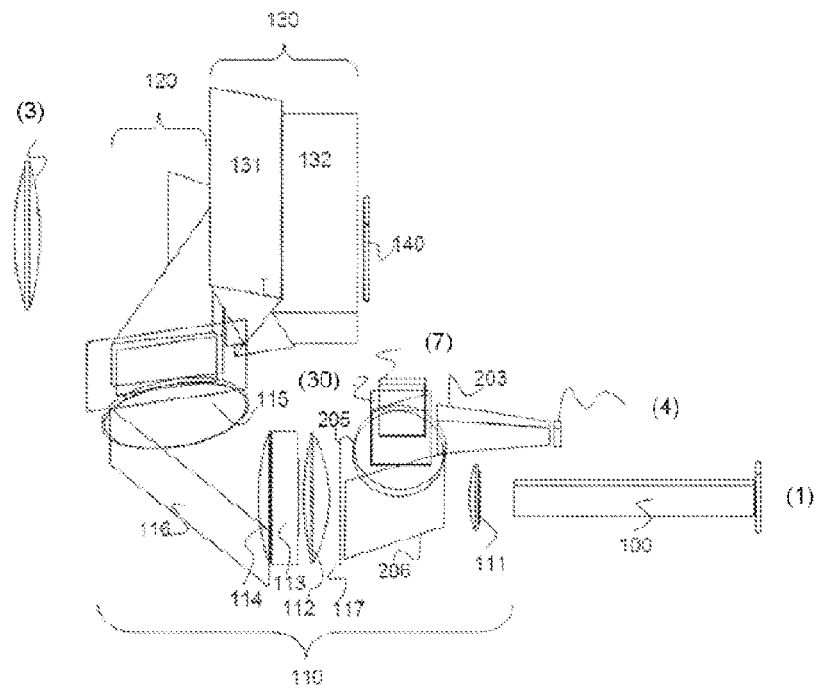
FIG. 10 shows a preferred embodiment of the system of the invention.

In a preferred embodiment a 3-chip DLP projector is used as imaging system as illustrated in FIG. 9 and FIG. 10. When looking at the light path of the 3-chip DLP projector, different elements can be identified from the projection light source (1) to the projection lens (3) onwards. As light source (1) an RGB laser light or a blue laser light and a yellow or green phosphor can be used and coupled to an optical integrator (100). At the exit of the optical integrator system a uniform light spot is achieved. This light spot is then imaged onto the DMD imagers (140) by means of the relay lens system (110). The relay lens system consists of various individual lens elements (111) till (115), a folding mirror (116) and aperture (117). The TIR prism assembly (120) sends the light towards the DMD imagers (140). A colour splitting prism (130) is placed between the TIR prism assembly (120) and the imagers (140). The system uses 0.95" DMD imagers with a 1920.times.1080 resolution. The size of the active area is approximately 20.7 mm.times.11.7 mm. The colour prism assembly (120) will split the light in its 3 spectral components, send it to the respective imager (140) and recombine the 3 spectral components into a single output beam towards the projection lens (3). An eye safety detection subsystem is inserted in the illumination system between lens element (111) and lens element (112). As detection sensor (7) in the detection subsystem, a time-of-flight sensor is combined on the same optical axis with an Infra-Red (IR) LED detection light source (4) via an optical component such as a polarizing beam splitter (30). The light from the IR LED detection light source (4) is passing through an integrator system such as a hollow tapered integrating rod (203). The internal walls of the hollow integrating rod are covered with a reflective silver coating. The exit area of the tapered integrator and the sensing area of the time-off-flight sensor are chosen to be similar in size. The time-of-flight sensor can be larger, with the effect that only a part of the sensor is effectively used for detection in the area of interest and therefore the resolution of the measurement is reduced. For the time-of-flight sensor the 19 k-S3 imager from PMD technologies GmbH is used. This sensor has an active area of 7.2 mm.times.5.4 mm and a resolution of 160.times.120 pixels. Since the width of this sensor is smaller than the width of the DMD, this sensor needs to be imaged onto the plane of the DMD with a magnification of at least 2.89 times. To accommodate a 10% larger detection area the magnification factor is chosen to be 3.15. In the vertical direction some rows of the time-off-flight sensor will remain unutilized, reducing the actual resolution to around 160.times.90 pixels. The sensor allows setting the area of interest accordingly. Because of the 3.15 magnification, also the acceptance angle of +/−12 degrees at the DMD is transformed to +/−38 degrees at the sensor.

Part of this magnification is provided by the lenses 112 till 115. Lens system 205 provides the remainder of the required magnification. Note that the DMD is tilted 12 degrees versus the optical axis of illumination system, in order to maintain the best possible focus on the time-of-flight detection sensor; also the detection sensor is tilted to provide the proper Scheimpflug correction. Even if this results in a geometric distortion of the detected image, this has limited influence on the ability of the system to properly detect the presence of a person or object in the protected space. The width of the exit of the tapered hollow integrator (203) is slightly larger than the width of the detection sensor. The aspect ratio of the exit of the hollow integrator is identical to the aspect ratio of the DMD. The exit dimensions are 7.5 mm.times.4.2 mm.

An Osram SFH 4750 IR LED can be used as the IR detection light source (4). The active chip area is 5.4 mm.times.2.1 mm and the emission wavelength is 850 nm. The entrance of the integrator such as the tapered hollow integrator (203) is matched to the size and positioned closely to the active area of the IR LED detection light source (4). Because of the tapering of the integrator, the acceptance angle for the IR detection light source becomes +/−52 degrees (7.5/5.4.times.38 degrees) along the long axis of the integrator and +/−76 degrees (4.2/2.1.times.38 degrees) along the short axis of the integrator. The system therefore couples the majority of the light from the IR LED detection light source to the detection subsystem. But more importantly the complete angular space of the projection system is filled with IR light. The SFH 4750 IR LED is capable of delivering a peak optical power of 14 W and an average power of 3.5 W. The polarizing beam splitter reduces this output by half. Assuming a transmission of 60% through the optical path and projection lens, the peak output power will be 4.2 W and the average power 1 W. The output power however has to be limited also to guarantee that the IR levels in front of the projection lens are below the Class 1 acceptable exposure limits of laser safety standard IEC 60825-1. From a position close to the lens, we can assume the subtended angular extent of the source to be above 100 mRad. In this case the maximum average power within a 7 mm diameter pupil is 0.029 W. When the spot size is 50.times.28 mm at the front glass of the projection lens, the maximum IR power should be limited to around 1 W, which is corresponding to the estimated output power.

To operate with the 19 k-S3 time-of-flight sensor, the IR LED is operated in pulsed regime with repetition rates up to 80 MHz. To meet Class 1 requirements of the laser safety standard IEC 60825-1 also the energy within a single pulse should be limited to be below 26.5 .mu.J. At 4.2 W peak power, the pulse duration should therefore be shorter than 6.3 .mu.s. For repetition rates in the MHz and 10's of MHz rate, this requirement is easily met. The repetition rate is selected such that reflections from the screen are extinct before a new measurement is started. For example if the screen is at 30 m distance, reflections will be received after 0.2 microseconds. A repetition rate below 5 MHz would then guarantee that reflections from the screen cannot interfere with subsequent measurements. The colour prism assembly (130) includes 1 prismatic element per primary colour onto which the DMD device (140) for that specific colour is attached. The colour prism includes a prismatic element (131) onto which the blue DMD is attached, a prismatic element (132) onto which the red DMD is attached and a prismatic element (133) onto which the green DMD is attached. Before each respective DMD there is an aperture plate (134) to block light outside the active area of the DMD. In front of the aperture (134b) of the red DMD, a bonded slanted microstructure with IR reflective coating is attached. The surface of the blue prism (131) adjacent to the red prism (132) is covered with a dichroic coating that will reflect the blue light and passes the red, infrared and green light. The surface of red prism (132) adjacent to the green prism is covered with a dichroic coating that will reflect the red and infrared light while it passes the green light. The infrared light will be reflected off the slanted microstructure before it reaches the aperture (134b). Together with the red, green and blue on-state light (510), it travels towards the projection lens. Light reflected back from the scene in front of the projection lens will travel the reverse IR light path and be imaged onto the time-off-flight sensor.

Embodiments of the present invention described above are able to determine information about objects in the projection zone such as a projection screen surface of a projection imaging system both statically and dynamically. This can be done by having a detection sensor or camera able to determine distances (e.g. using a ToF sensor or camera) from the detector to the projection screen. Preferably an image of that which is projected onto the projection screen (20) can also be imaged by the detection sensor or camera statically and/or dynamically. Electronics receiving images from the detection subsystem can be configured to analyze such images from the sensor or camera images and can derive one or more or all of:

whether more than one projection screen is present within a projection cone. For projectors that are to be used with the Barco Escape™, three screens would be expected, a front screen and two lateral screens. The reflected light from such a multiscreen arrangement can be detected by the detector subsystem and 3D information extracted from electronics and a warning raised if there are not three screens or when one screen is not at the correct angle, or the projection system is not projecting images along an optical path consistent with the detected screens, or a projection screen is not aligned with the projection imaging system, e.g. whether a screen is perpendicular or not perpendicular to the optical axis of the projection imaging system.

The same images can be analysed by the electronics to determine whether the surface of a projection screen is not flat or is not a correct shape such as spherical or cylindrical or whether the surface of a projection screen surface is not reflecting light from a projection light source correctly or the quality of the projection screen surface is not sufficient, The determination of the surface of a projection screen not being flat or not being a correct shape or whether the surface of a projection screen surface is not reflecting light from a projection light source correctly or the quality of the projection screen surface is not sufficient, can be determined by the electronics either statically and/or dynamically, i.e. varying in time. The projection system can project a structured light image to aid in the detection of screen surface quality and flatness.

In case the projection screen is determined to be misshaped e.g. curved rather than flat, the electronics can be configured to perform warping of the images to be projected or for example blending of the images where they overlap. Image warping, scaling, rotating, focusing, zooming, blending can be done statically or dynamically, i.e. to capture variations with time. Image Geometry Correction is a known process of digitally manipulating image data that can be applied by the electronics such that the image data for projection matches the specific measured projection surface or shape of the projection screen surface, statically and/or dynamically. Image geometry correction compensates for the distortion created by off-axis projector or screen placement or non-flat screen surface, by applying a pre-compensating inverse distortion to that image in the digital domain. Image geometry correction can be applied by the electronics to static or dynamic images (i.e. video). Image geometry correction is generally implemented by graphics processing or signal processing. These involve a real time execution of a spatial transformation from the input image to the output image. The spatial transformation may be calculated by several different methods.

In graphics processing, the spatial transformation consists of a mesh that can be used to render an image. Such a mesh can be polygon mesh which is often made up of triangles. The transformation is executed by texture mapping from the rectilinear mesh of the input image to the transformed shape of the destination image. Each polygon on the input image is thus applied to an equivalent (but transformed in shape and location) polygon in the output image.

Signal processing based image geometry correction is a known technique wherein the spatial transformation comprises a spatially defined 2-dimensional image re-sampling or scaling filter. The scaling operation can be performed with different scaling ratios in different parts of the image, according to the defined transformation. Signal processing based image geometry correction is often carried out on dedicated hardware or in Graphics Processing Units (GPU) in the projection system or in stand-alone Video Signal Processors. Signal processing based image geometry correction in accordance with embodiments of the present invention can include rotation of a projected image, e.g. by rotation of the projector.

The image geometry correction transformation required in embodiments of the present invention can be calculated by predictive geometry, e.g. calculating where an image should land on a regular surface such as sphere or a cylinder, or by an automatic optical feedback system using a camera of the detection subsystem. Image from the camera can be used to evaluate the alignment of test images projected by the projection system.

Analysis of distance related or 3D image data from the detection subsystem can be used to determine whether a projection screen is too far away or too close to the projection imaging system and whether the distance to the screen is varying. If too far away, the light output of the projection system can be increased along with a change in zoom magnitude to make the projected image fill the size of the detected screen. If too close the light output of the projection system can be decreased and the zoom magnitude can be changed so that the projected image fills the projection screen.

Analysis of image data from the detection subsystem can be used to determine if the image projected onto a projection screen surface is out of focus. This can be done by projecting line images. The received image can then be filtered by the electronics to determine contrast jumps indicative of a line. If the line is out of focus the contrast jump will be lower than expected.

Analysis of distance related or 3D image data from the detection subsystem can be used to determine whether there is an object such as a person illuminated in the projection cone. If a person is detected, e.g. by movement the laser light can be reduced or switched off.

Another aspect of the present invention is to provide a system and method for determining three-dimensional (3D) information regarding a surface of an object and for projecting information onto the object surface such as a projection screen surface. For example, an unmanned aerial vehicle or "drone" can be configured to fly with an on-board projector and detection subsystem. The detection subsystem can capture images from illuminated objects, e.g. can have a detection sensor such as a detection camera or a scanning device located on the unmanned aerial vehicle. The detection camera can be a ToF camera. The detection subsystem can be used by on-board or ground based electronics to measure the extent of a projection screen, i.e. two-dimensional size data or to derive three dimensional data of the object surface, e.g. projection screen surface and whether that extent changes with time. Another aspect of the present invention is to provide a system and method for determining three-dimensional (3D) static or dynamic information regarding a surface of one or multiple objects and for projecting information onto the object(s) surface such as a projection screen surface. An unmanned aerial vehicle or drone can be configured to fly with an on-board projector and detection subsystem and to hover. In embodiments of the present invention the detection subsystem can capture images from illuminated objects, e.g. can have a scanning device located on the unmanned aerial vehicle. The detection subsystem can be used by on-board or ground based electronics to measure the extent of a projection screen, i.e. two-dimensional size data or to derive three dimensional data of the object surface, e.g. projection screen surface or also dynamic changes in the extent. A ground controller can be provided to control the flight path of the unmanned aerial vehicle, to maneuver the unmanned aerial vehicle into location in front of a suitable projection screen, and to hover there and project images onto the projection screen surface. If the drone changes position, e.g. do to wind or draughts, the projection system can be adapted to warp images projected to maintain the same image on the projection surface. Alternatively if the projection surface changes position, the projection system can react accordingly and adapt the projection cone position, by e.g. lens shifting and zooming, physically moving the projection system itself in the case of a drone for example or via the use of a moveable platform or mirror as used in Gobo lights for example. A drone or unmanned aerial vehicle according to embodiments of the present invention can include a projector and a stabilizer, or a projector-stabilizing mount. Such a device holds a projector in a manner that prevents or compensates for unwanted projector movement due to movement of the drone or unmanned aerial vehicle and/or that information determined by the drone detection system is input into the stabilizer which then compensates for changes in the alignment between the projector and the projection surface or other deviations which are detected by the detection system, e.g. rotation, up and down or back and forth movements.

The stabilization can make use of springs as shock absorbers. Projector stabilization can also be performed by one or more on-board gyroscopes whose stability can be used to sense disruptive motion. The stabilization can be performed by a combination of a mechanical and an electronic stabilization.

A ground or an embedded controller can be provided to control the flight path of the unmanned aerial vehicle and to project images on suitable surfaces using an on-board projection system. Such "projector drones" are able to fly to certain buildings or walls and to project images onto the buildings or walls or onto a screen which could be held vertically. To keep the drone projecting a stable image onto the wall or screen the electronics of the drone can be configured to use the detection system on the drone to detect dynamically varying information such as a distance to a wall or screen, misalignment between projection system of the drone and the wall or screen, changes in shape of the wall or screen, movements of the drone, and to compensate for these either statically or dynamically, e.g. by stabilization of the projector, scaling the images, rotating or warping the images, focusing the images, blending the images, zooming, increasing or decreasing the luminosity projected altering color balance or white point, etc., either statically or dynamically. Such electronics may include an image processing engine such as graphics processor, a microprocessor, an FPGA, an ASIC or similar as well as Random Access Memory and/or Read only Memory, or non-volatile memory. The image processing engine may be programmed to carry out any of the methods of the present invention such as static or dynamic distance detection, static or dynamic rotation detection using a ToF sensor or camera, static or dynamic projection screen misalignment, static or dynamic lack of flatness of the projection screen surface detection, and to compensate for these, e.g. by scaling, rotating or warping or blending of the projected images including the use of a stabilizer or a stabilizing mount for the projector. The stabilization system can make use of springs as shock absorbers to compensate for shocks to the airborne vehicle. Projector stabilization can also be performed by the use of one or more on-board gyroscopes whose stability can be used to sense disruptive motion and to correct the position of the projector to compensate. In accordance with embodiments of the present invention stabilization can be performed by a combination of a mechanical and an electronic stabilization. The electronic stabilization can include an input from the on-board detection system and/or from one or more on-board sensors such as accelerometers, global position sensors, etc. as well as processing of the input of these one or more sensors to correct an image projected by an on-board projector. The processing can be provided by an on-board processing engine such as a microprocessor, an ASIC, an FPGA in combination with suitable Random Access memory and/or Read only Memory and/or non-volatile memory. The stabilization can also include suitable actuators to adjust the position of the on-board projector which are driven by drivers reacting to the compensating output of the processing engine, e.g. via I/O ports. The stabilization output signals may also be provided by one or more microcontrollers. The stabilization system and/or mount can be provided by a stabilization system and/or mount for a camera but applied to the on-board projector. Embodiments of the present invention also provide a gyroscopically stabilized projector.

The invention claimed is:

1. A projection system including a projection light source having a first optical axis, a projection imaging system, a projection lens system, a detection light source having a second optical axis and a detection sensor having a third optical axis, the detection light source having a detection light source volume in which object are illuminated, the objects being detected when they fall within a detection volume, wherein the detection sensor is a Time of Flight (ToF) sensor for producing an image and for determining distances to the detection sensor of an illuminated projecting surface in the detection light source volume, further comprising an optical component configured to combine the first, second and third and optical axes of the detection sensor and the detection light source respectively with the first optical axes of the projection light source within the projection lens system.

2. The projection system according to claim 1 further comprising a detection subsystem having the optical component configured to combine the optical axis of the detection source and the optical axis of the ToF sensor.

3. The projection system according to claim 1, wherein the ToF sensor is a ToF camera for dynamic or static distance measurement.

4. The projection system according to claim 1, wherein the detection light source is an Infra-Red light source.

5. The projection system according to claim 1, wherein said optical component configured to combine the optical axis of the detection source and the optical axis of the detection sensor is selected from a beam splitter, and a light guide, photosensitive elements and detection light emitting elements that are integrated on a single semiconductor substrate.

6. The projection system according to claim 1, wherein the projection imaging system is a Digital Light Processing (DLP) system comprising a colour prism assembly including one prismatic element per primary colour onto which a DMD device for that specific colour is attached; and also comprising a TIR prism assembly.

7. A projection system comprising a detection system for a projection space, said projection system including a projection light source with a first optical axis, a projection imaging system, a projection lens system, a detection light source having a second optical axis and a detection sensor having a third optical axis, and further comprising an optical component configured to combine the second and third optical axes of the detection sensor and the detection light source, respectively with the first optical axis of the projection light source before the projection lens system, wherein the detection sensor is a Time of Flight (ToF) sensor for producing an image and for determining distances to a projecting surface illuminated by the detection light source.

8. The projection system according to claim 7, further comprising a detection subsystem having the optical component configured to combine the second and third optical axes of the detection light source and the detection sensor, respectively.

9. The projection system according to claim 7, wherein the detection sensor is a ToF camera for dynamic or static distance measurement.

10. The projection system according to claim 7, wherein the detection light source is an Infra-Red light source.

11. The projection system according to claim 7, wherein said optical component configured to combine the optical axis of the detection source and the optical axis of the detection sensor is selected from a beam splitter, a light guide and photosensitive elements and detection light emitting elements that are integrated on a single semiconductor substrate.

12. The projection system according to claim 7, wherein the imaging system is a Digital Light Processing (DLP) system comprising of a colour prism assembly including one prismatic element per primary colour onto which a DMD device for that specific colour is attached; and also comprising a TIR prism assembly.

13. The projection system according to claim 12, wherein a dichroic mirror combines the optical axis of the projection light source with the optical axis of the detection sensor and detection light source before entering the TIR prism assembly; and wherein partially reflective coatings of the colour prism assembly are selected such that the detection light and reflected detection light is guided towards the red DMD; and wherein in front of the red DMD, a bonded slanted microstructure with IR reflective coating is attached.

14. A projection system including a detection system for a projection space, said projection system including a projection light source, a projection imaging system, a projection lens system, a detection sub-system comprising at least a detection light source and a detection sensor, wherein a projecting surface is illuminated when in a detection light source volume and detected when it falls within a detection volume, so blind spots are excluded, wherein a detection subsystem includes an optical component configured to combine an optical axis of the detection light source and an optical axis of the detection sensor, the detection sensor is a Time of Flight (ToF) sensor.

15. The projection system according to claim 14, wherein the detection sensor is a ToF camera for dynamic or static distance measurement.

16. The projection system according to claim 14, wherein the detection light source is an Infra-Red light source.

17. The projection system according to claim 14, wherein said optical component configured to combine the optical axis of the detection source and the optical axis of the detection sensor is selected from, a beam splitter, a light guide and photosensitive elements and detection light emitting elements that are integrated on a single semiconductor substrate.

18. The projection system according to claim 14, wherein the projection imaging system is a Digital Light Processing (DLP) system comprising a colour prism assembly including one prismatic element per primary colour onto which a DMD device for that specific colour is attached; and also comprising a TIR prism assembly.

19. The projection system according to claim 18, wherein a dichroic mirror combines the optical axis of the projection light source with the optical axis of the detection sensor and detection light source before entering the TIR prism assembly; and wherein partially reflective coatings of the colour prism assembly are selected such that the detection light and reflected detection light is guided towards a red DMD; and wherein in front of the red DMD, a bonded slanted microstructure with IR reflective coating is attached.

20. The projection system according to claim 14, wherein at least a part of the projection lens system also serves as a lens of the detection sensor.

21. A projection system including a detection system for a projection space, said projection system including a projection light source, a projection imaging system, a projection lens system, a detection light source and a detection sensor, and further comprising an optical component configured to combine the optical axes of the detection sensor and detection light source with the optical axis of the projection light source within the projection lens system, wherein the projection imaging system is a Digital Light Processing (DLP) system comprising a colour prism assembly including one prismatic element per primary colour onto which a DMD device for that specific colour is attached; and also comprising a TIR prism assembly, wherein a dichroic mirror combines the optical axis of the projection light source with the optical axis of the detection sensor and detection light source before entering the TIR prism assembly; and wherein partially reflective coatings of the colour prism assembly are selected such that the detection light and reflected detection light from a projecting surface is guided towards a red DMD; and wherein in front of the red DMD, a bonded slanted microstructure with IR reflective coating is attached, and the detection sensor is a Time of Flight (ToF) sensor for dynamic or static distance measurement.

22. The projection system according to claim 21, wherein the detection light source is an Infra-Red light source.

23. The projection system according to claim 21, wherein said optical component configured to combining the optical axis of the detection source and the optical axis of the detection sensor is selected from a beam splitter, a light guide and photosensitive elements and detection light emitting elements that are integrated on a single semiconductor substrate.

* * * * *